INVENTOR.
ANDRE FRANÇOIS CONCHON

Feb. 24, 1959　　　　　A. F. CONCHON　　　　　2,874,716
AUTOMATIC FEEDING AND LEVEL CONTROL SYSTEM
Filed March 6, 1957　　　　　　　　　　　　　4 Sheets-Sheet 2

INVENTOR.
ANDRE FRANÇOIS CONCHON
BY

Feb. 24, 1959     A. F. CONCHON     2,874,716

AUTOMATIC FEEDING AND LEVEL CONTROL SYSTEM

Filed March 6, 1957     4 Sheets-Sheet 3

INVENTOR.
ANDRE FRANÇOIS CONCHON
BY

Feb. 24, 1959  A. F. CONCHON  2,874,716
AUTOMATIC FEEDING AND LEVEL CONTROL SYSTEM
Filed March 6, 1957  4 Sheets-Sheet 4

INVENTOR.
ANDRE FRANÇOIS CONCHON

United States Patent Office 2,874,716
Patented Feb. 24, 1959

2,874,716

AUTOMATIC FEEDING AND LEVEL CONTROL SYSTEM

Andre Francois Conchon, Rio de Janeiro, Brazil

Application March 6, 1957, Serial No. 644,335

Claims priority, application Brazil March 7, 1956

8 Claims. (Cl. 137—394)

The present invention relates to an apparatus for automatically maintaining the surface of a liquid at a predetermined elevation.

For example, the present invention may be used in connection with the supply of liquids, such as inks or dyes, to machines for printing material such as cloth or the like.

One of the objects of the present invention is to provide means capable of automatically maintaining the level of a liquid at all times close to a predetermined, desired elevation.

Another object of the present invention is to provide means highly sensitive to changes in the desired liquid level and capable of adjusting the liquid level to the desired elevation.

Further object of the present invention is to provide means requiring but a small amount of power for producing the desired results.

An additional object of the present invention is to provide means composed of simple and ruggedly constructed parts capable of operating reliably to accomplish the above objects.

The above and other objects of the invention will become further apparent from the following detailed description, reference being made to the accompanying drawings, showing preferred embodiments of the invention.

Figure 1:
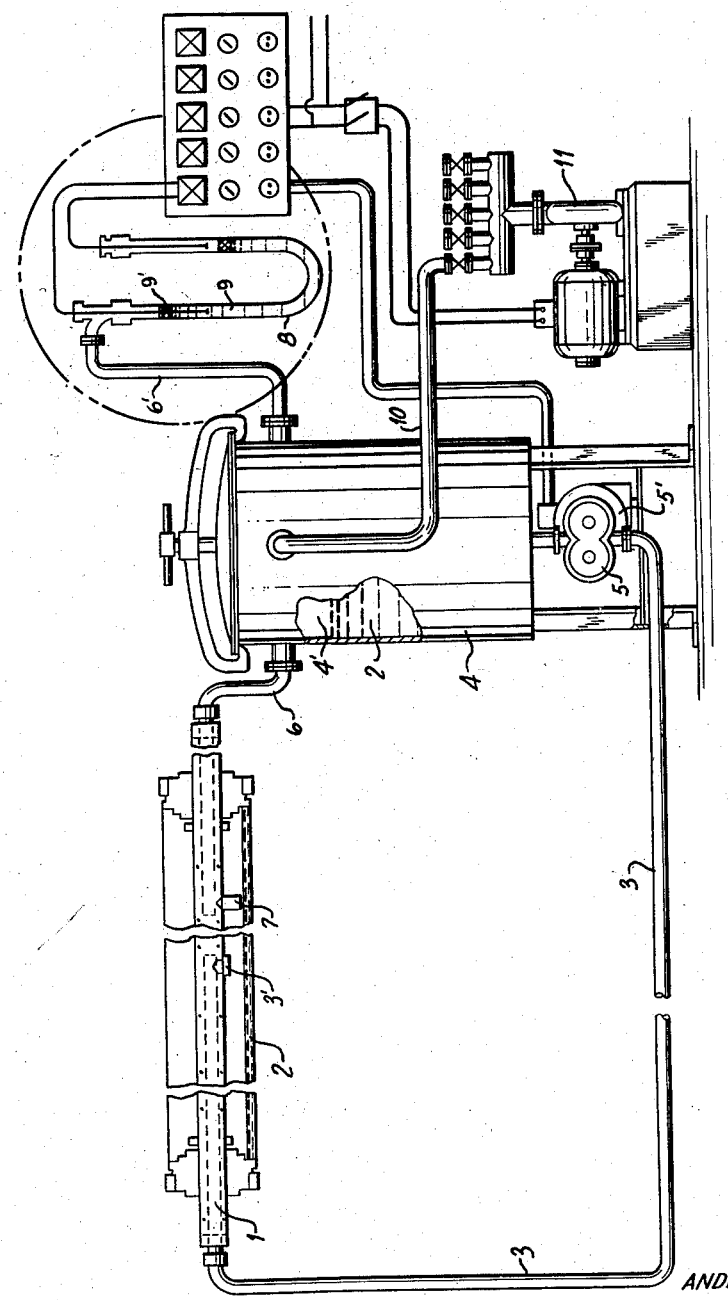
Fig. 1 is a partly schematic illustration of one possible embodiment of the invention used in connection with an apparatus for printing cloth.

Referring now more particularly to the drawings, there is disclosed in Fig. 1 an embodiment of the invention in the form of an apparatus for printing cloth. Thus, a hollow printing roll 1 is shown in Fig. 1, and a suitable dye liquid 2 is supplied to the interior of the roll 1 for passing through suitable passage means thereof to print cloth in a known manner. A tank 4 holds the dye liquid 2 to be supplied to the roll 1, and the tank 4 has above the liquid 2 therein an air space 4' closed off from the outer atmosphere.

A conduit means 3 communicates with a lower portion of the tank 4 and leads therefrom to the interior of the roll 1 where the conduit means 3 has an open discharge end 3' from which the liquid 2 falls. A pump 5 is operatively connected to the conduit means 3 for moving the liquid 2 from the tank 4 along the conduit means 3 to the discharge end 3' thereof. The pump 5 is driven by drive means in the form of an electrical motor 5'.

A duct 6 has a downwardly directed open end portion 7 located in the interior of the roll, and the length of the end portion 7 of the duct 6 may be adjusted in any known way, so that the bottom open extremity of the end portion 7 may have its elevation adjusted. For example, end portion 7 may be made of telescoped tubes. The duct 6 communicates with the air space 4'.

A suction arrangement or means 10, 11 also communicates with the air space 4' for maintaining the pressure in the air space at less than atmospheric pressure. The suction means 10, 11 includes a tube 10 communicating with the air space 4' and with a vacuum pump 11 driven by any suitable motor such as that shown in Fig. 1.

A control means constructed according to the present invention communicates with the air space 4' and is operatively connected to the drive means 5' for maintaining the latter in operation as long as the bottom extremity of end portion 7 of the duct 6 is not closed by the liquid 2 in the roll 1. As soon as the level of the liquid in the roll 1 rises sufficiently to close the end portion 7 of the duct 6, the suction means 10, 11 will further reduce the pressure in the air space 4', and the control means according to the invention will respond to this reduction in pressure by opening an electric circuit of the motor 5' in order to stop operation of the latter. Thus, when the level of liquid 2 in the roll 1 is at the desired elevation no more liquid will be supplied to the interior of the roll 1, and as soon as the liquid level in roll 1 drops slightly more liquid will be supplied. In this way the apparatus according to the invention maintains the liquid level in the roll 1 at the desired elevation.

An embodiment of the above-described control means is shown in Fig. 1 in the organization described above and in Fig. 2 by itself on an enlarged scale. This control means includes a tube 6' communicating with the air space 4' and having a U-shaped portion 8. An electrically conductive liquid is located in the U-shaped portion 8, and as the pressure in the air space 4' changes the liquid in one leg of the U-shaped portion 8 will rise while the liquid will fall in the other leg. In the illustrated example the liquid will rise in the left leg and fall in the right leg of the U-shaped portion 8 when the pressure of the air space 4' drops.

The control liquid 9 within the tubular portion 8 may be any suitable electrically conductive liquid such as mercury, or the like. Where the liquid is mercury, layers 9' of antioxidizing liquid may be located on the top surfaces of the mercury to prevent undesirable reaction of the latter with air.

A pair of electrically conductive means 12 and 13 are connected electrically with the motor 5' so as to cause the latter to operate when a circuit is completed across the free ends of the leads 12 and 13. These leads respectively extend downwardly along the interior of the legs of the U-shaped tubular portion 8, and the elevation of the bottom ends of the leads 12 and 13 is such that when the pressure of the air space 4' drops below a predetermined value the electrically conductive liquid will no longer be in contact with the lead 13, as shown in Figs. 1 and 2, so that the circuit to the motor will be opened and the motor will not operate.

When the pressure of the air space 4' rises to a predetermined value, the liquid in the right leg of the tubular portion 8 will have risen sufficiently to engage the lead 13 and start the operation of the motor 5'.

Figure 3:
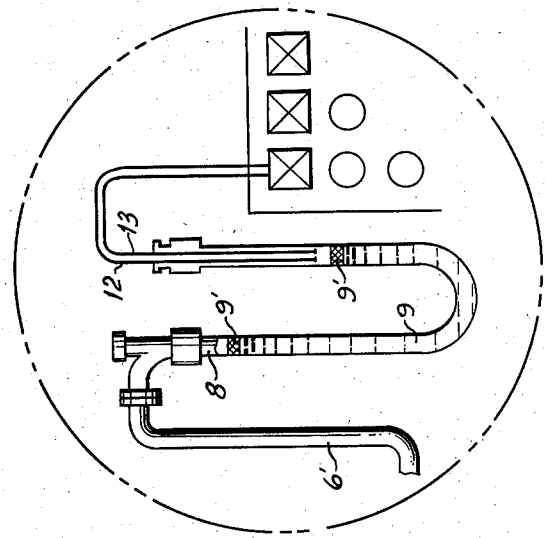
Fig. 3 is an illustration of another embodiment of this control apparatus.
Figure 2:
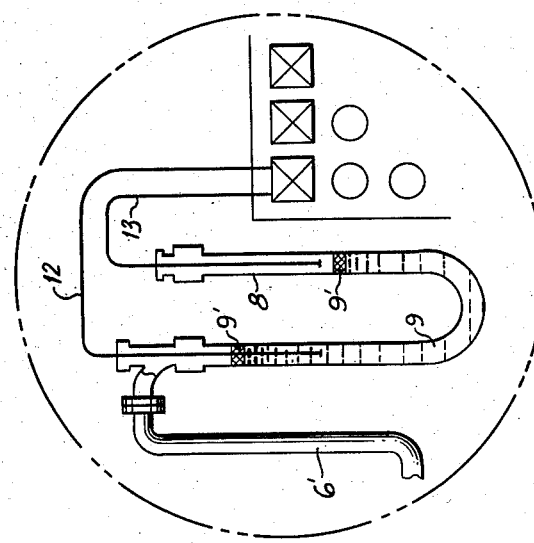
Fig. 2 is an enlarged detailed view of a control apparatus of Fig. 1.

The embodiment of Fig. 3 differs from that of Fig. 2 only in that the leads 12 and 13 are both located in one leg of the U-shaped tubular portion 8.

Figure 4:
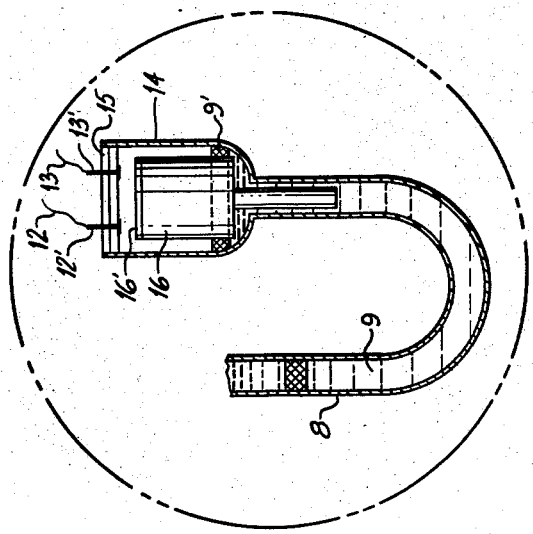
Fig. 4 is a fragmentary, sectional elevation of a further embodiment of a control apparatus according to the present invention.

In the embodiment of the invention which is shown in Fig. 4, the right leg of the tubular portion 8 has an upper widened portion 14 closed by wall 15 of electrically non-conductive material, and leads 12 and 13 are respectively connected to a pair of contacts 12' and 13' having free ends accessible at the underside of the wall 15 within the enlarged tubular portion 14. The liquid in the right leg of the tubular portion 8 carries a float 16 which floats on top of this liquid, and the float 16 may be made of an electrically non-conductive material, except for a top plate 16' fixed to the float 16 and engaging the contacts 12' and 13' to complete a circuit across the latter when the liquid in the right leg of the tubular portion 8 rises sufficiently.

Figure 5:
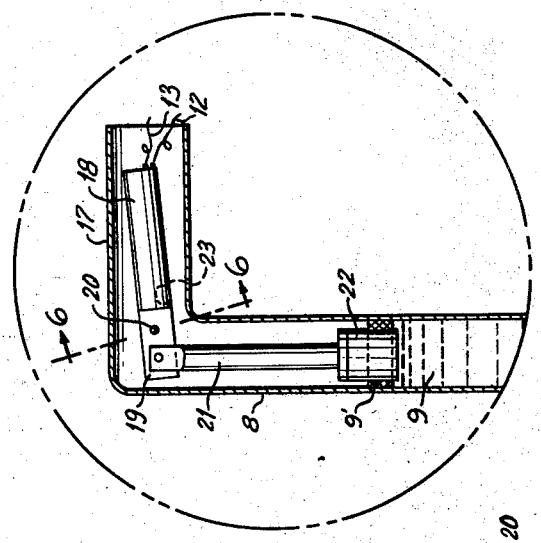
Fig. 5 shows a still further embodiment of a control apparatus according to the present invention.

In the embodiment of the invention which is shown in Fig. 5, the liquid in the right leg of the tubular portion 8 carries a float 22 fixed to the bottom end of a rod 21, which extends upwardly to a lever 19 to which the rod 21 is pivotally connected.

Figure 6:
Fig. 6 is a sectional view taken along the lines 6—6 of Fig. 5 in the direction of the arrows.

The tubular portion 8 has a horizontal tubular extension 17 which carries a pivot pin 20 passing through an opening of the lever 19 at the right of its connection with the rod 21 (Fig. 6). At the right of the pivot pin 20 the lever 19 carries a mercury switch 18 enclosing a quantity of mercury 23 which rolls down to the right end of the switch 18 to close the circuit between the leads 12 and 13 which are connected to the mercury switch.

The circuit will be closed when the rod 21 and float 22 rise sufficiently to turn the lever 19 clockwise, as viewed in Fig. 5, through an angle sufficient to cause the mercury 23 to roll down the mercury switch.

Figure 7:
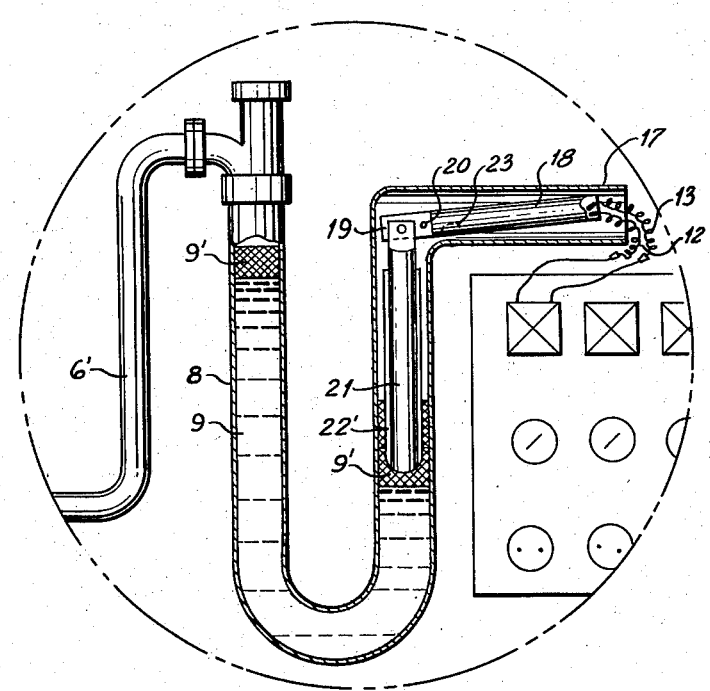
Fig. 7 is an illustration of a variation of the embodiment of Fig. 5.

Fig. 7 differs from Fig. 5 only in that said float 22 of Fig. 5 is replaced by a tube 22' floating on the liquid and into which the rod 21 extends, the bottom end of rod 21 being fixed to or simply engaging the bottom of the tube 22'.

Thus, it will be seen that the above-described invention provides an apparatus for automatically controlling the level of a liquid at a desired location. This apparatus includes a tank for holding the liquid, this tank having above the liquid an air space closed off from the outer atmosphere. A conduit means communicates with a lower portion of the tank for directing the liquid therefrom to a discharge end of the conduit means at a desired location.

A pump means communicates with the conduit means for moving the liquid from the tank along the conduit means to the discharge end thereof, and a drive means is operatively connected to the pump means for driving the latter.

A duct has an elongated downwardly extending open end portion at the location of the liquid, and the elevation of the bottom open extremity of the end portion of the duct is at the desired level of the surface of the liquid, this duct communicating with the air space in the tank. A suction means also communicates with this air space for maintaining the pressure thereof at less than atmospheric pressure. A control means is operatively connected with the drive means and also communicates with the air space for stopping the operation of the drive means when the pressure in the air space falls below a given value and for starting the operation of the drive means when this pressure rises above a given value.

The above described structure of the invention is relatively sensitive and maintains the liquid level in the roll 1 at all times close to the desired elevation.

The power of the suction pump 11 is fairly limited and is just great enough to move the liquid 9 in the tubular portion 8 through a predetermined range.

Various changes and modifications may be made without departing from the spirit and scope of the present invention and it is intended that such obvious changes and modifications be embraced by the annexed claims.

Having thus described the invention, what is claimed as new and desired to be secured by Letters Patent, is:

1. An automatic liquid level controlling apparatus comprising a tank for holding a liquid and having above the liquid an air space closed off from the outer atmosphere, conduit means extending from said tank and having distant from the latter a discharge end through which liquid flowing from the tank along said conduit means is discharged at a desired location, a pump communicating with said conduit means for moving the liquid from the tank along the conduit means to the discharge end thereof, drive means including an electric circuit and operatively connected to said pump for driving the latter, a duct having a downwardly directed elongated open end portion located at said location with the bottom open extremity of said end portion located at the elevation at which it is desired to maintain the liquid at said location, said duct communicating with said air space in said tank, suction means communicating with said air space in said tank for maintaining said air space at less than atmospheric pressure, whereby air will continuously flow through said open end portion of said duct along the latter into said air space until the liquid level is high enough to close said end portion of said duct and to cause said suction means to reduce further the pressure of said air space, and control means communicating with said air space and operatively connected to said drive means for maintaining said drive means in operation as long as the liquid level is below said end portion of said duct and for stopping the operation of said drive means when the pressure of said air space drops upon closing of said open extremity of said end portion of said duct by the liquid at said location, said control means including an elongated tube communicating with said air space and having a U-shaped portion in which a control liquid is located, said control liquid rising in one leg of the U-shaped portion and falling in the other leg thereof in response to pressure variation in said air space, said control means including electrical switch means responsive to movement of the control liquid for opening said electric circuit connected to said drive means when the pressure in said air space drops below a predetermined value and for closing said circuit to start said drive means when said pressure rises to a predetermined value.

2. Apparatus according to claim 1, said switch means including a pair of spaced contacts carried by said tube at one of said legs of said U-shaped portion thereof, a float floating on said control liquid in said one leg, and an electrically conductive member carried by said float and moving into engagement with both of said contacts when the liquid in said one leg rises to a predetermined elevation.

3. Apparatus according to claim 1, said electrical switch means including a pair of conductors and said control liquid being electrically conductive, said conductors being bridged by said control liquid to complete the circuit and said control liquid moving away from at least one of said conductors to open the circuit.

4. Apparatus according to claim 3, said conductors, respectively, extending into said legs of said U-shaped portion of said tube.

5. Apparatus according to claim 3, both of said conductors being located in one leg of said U-shaped portion of said tube.

6. Apparatus according to claim 1, said switch means including a lever pivotally carried by one of said legs of said U-shaped portion of said tube and carrying on one side of its pivot axis a mercury switch which tilts with said lever, a rod pivotally connected to said lever on the opposite side of said pivot axis and extending downwardly toward the liquid in said one leg of said U-shaped portion of said tube, and means floating on said liquid in said one leg and operatively engaging said rod for moving the latter up and down.

7. Apparatus according to claim 6, said means operatively engaging said rod being in the form of a float fixed to the bottom end of said rod and floating on the control liquid in said one leg.

8. Apparatus according to claim 6, said means operatively engaging said rod being in the form of a hollow tube floating on the control liquid in said one leg and into which said rod extends, said rod having a bottom end engaging a lower portion of the latter tube.

References Cited in the file of this patent

UNITED STATES PATENTS

| | | |
|---|---|---|
| 909,574 | Ford | Jan. 12, 1909 |
| 1,981,160 | Baldwin | Nov. 20, 1934 |
| 2,314,421 | Peterson | Mar. 23, 1943 |